United States Patent
Geiszler et al.

(10) Patent No.: US 8,680,966 B2
(45) Date of Patent: Mar. 25, 2014

(54) LONG RANGE RADIO FREQUENCY IDENTIFICATION SYSTEM

(71) Applicant: FP Wireless, LLC, San Jose, CA (US)

(72) Inventors: Theodore D. Geiszler, Monte Sereno, CA (US); Paul G. Saldin, Stillwater, MN (US); Eric W. Lofstad, Circle Pines, MN (US)

(73) Assignee: FP Wireless, LLC, San Jose, CA (US)

( * ) Notice: Subject to any disclaimer, the term of this patent is extended or adjusted under 35 U.S.C. 154(b) by 0 days.

(21) Appl. No.: 13/675,885

(22) Filed: Nov. 13, 2012

(65) Prior Publication Data

US 2013/0069762 A1 Mar. 21, 2013

Related U.S. Application Data

(63) Continuation-in-part of application No. 12/389,179, filed on Feb. 19, 2009, now Pat. No. 8,310,344.

(51) Int. Cl.
*G05B 23/00* (2006.01)

(52) U.S. Cl.
USPC ....... 340/5.65; 340/10.1; 340/10.2; 340/10.3; 340/10.31; 340/10.32; 340/10.33; 340/10.34; 340/10.4; 340/10.41; 340/10.42; 340/10.5; 340/10.51; 340/10.52; 340/10.6; 235/375; 235/376; 235/377; 235/378; 235/379; 235/380; 235/381; 235/382; 235/382.5; 235/383; 235/384; 235/385

(58) Field of Classification Search
USPC .......................... 340/10.1–10.6, 572.1–572.9; 235/375–385
See application file for complete search history.

(56) References Cited

U.S. PATENT DOCUMENTS

| | | | |
|---|---|---|---|
| 3,914,762 A * | 10/1975 | Klensch | 340/5.61 |
| 4,333,072 A | 6/1982 | Beigel | |
| 4,425,645 A | 1/1984 | Weaver et al. | |
| 4,519,068 A | 5/1985 | Krebs et al. | |
| 5,041,826 A | 8/1991 | Milheiser | |
| 5,050,150 A | 9/1991 | Ikeda | |
| 5,343,469 A | 8/1994 | Ohshima | |
| 5,347,263 A | 9/1994 | Carroll et al. | |
| 5,357,567 A * | 10/1994 | Barron et al. | 379/406.06 |

(Continued)

FOREIGN PATENT DOCUMENTS

| WO | 97/35391 | 9/1997 | |
|---|---|---|---|
| WO | WO 9735391 A1 * | 9/1997 | H04B 15/00 |

OTHER PUBLICATIONS

IDTechEx White Paper, "RFID Explained", Website: www.idtechex.com (2005).

(Continued)

*Primary Examiner* — George Bugg
*Assistant Examiner* — Paul Obiniyi
(74) *Attorney, Agent, or Firm* — Nixon Peabody LLP

(57) ABSTRACT

A method, apparatus and system for radio frequency identification provides a modulated illumination signal containing a sequence of bits configured to illuminate a radio frequency identification (RFID) tag, The illumination signal is received at the RFID tag, rectified to generate a wake signal for waking a processor which is subsequently powered by a battery. The received illumination signal is sampled and subjected to a thresholding process. Mobile telephone band interference is countered by correlating the sampled illumination signal to determine its bit sequence and then correlating the bit sequence against a predetermined key. An identification signal from the RFID tag is sent in response to a match.

25 Claims, 11 Drawing Sheets

(56) References Cited

U.S. PATENT DOCUMENTS

| | | | |
|---|---|---|---|
| 5,594,384 A * | 1/1997 | Carroll et al. ............... 329/369 |
| 5,600,683 A | 2/1997 | Bierach et al. | |
| 5,828,693 A * | 10/1998 | Mays et al. .................. 375/136 |
| 5,909,462 A * | 6/1999 | Kamerman et al. .......... 375/147 |
| 6,169,483 B1 * | 1/2001 | Ghaffari et al. ........... 340/572.3 |
| 6,212,175 B1 * | 4/2001 | Harsch ......................... 370/338 |
| 6,285,681 B1 | 9/2001 | Kolze et al. | |
| 6,307,517 B1 | 10/2001 | Lee | |
| 6,337,634 B1 * | 1/2002 | O'Toole et al. ............. 340/10.5 |
| 6,377,176 B1 | 4/2002 | Lee | |
| 6,411,199 B1 * | 6/2002 | Geiszler et al. ............. 340/10.1 |
| 6,483,926 B1 * | 11/2002 | Yamashita et al. ........... 381/71.7 |
| 6,838,989 B1 * | 1/2005 | Mays et al. ............... 340/572.1 |
| 6,963,270 B1 | 11/2005 | Gallagher, III et al. | |
| 7,079,020 B2 * | 7/2006 | Stilp ............................. 340/506 |
| 7,183,895 B2 * | 2/2007 | Bazakos et al. ................ 340/5.7 |
| 7,195,173 B2 * | 3/2007 | Powell et al. ................. 235/492 |
| 7,287,693 B2 * | 10/2007 | Brookner ...................... 235/382 |
| 7,497,384 B2 * | 3/2009 | Powell et al. ................. 235/492 |
| 7,724,145 B2 * | 5/2010 | Batra et al. ................. 340/572.8 |
| 7,817,013 B2 * | 10/2010 | Bazakos et al. ................ 340/5.7 |
| 7,843,313 B2 * | 11/2010 | Bazakos et al. ................ 340/5.7 |
| 2005/0055582 A1 * | 3/2005 | Bazakos et al. ............... 713/202 |
| 2005/0110610 A1 * | 5/2005 | Bazakos et al. .............. 340/5.82 |
| 2005/0211787 A1 * | 9/2005 | Stewart et al. ................ 235/492 |
| 2006/0082438 A1 * | 4/2006 | Bazakos et al. .............. 340/5.82 |
| 2006/0082439 A1 * | 4/2006 | Bazakos et al. .............. 340/5.82 |
| 2006/0082445 A1 * | 4/2006 | O'Toole et al. ............. 340/10.4 |
| 2006/0132302 A1 * | 6/2006 | Stilp ........................ 340/539.22 |
| 2006/0163349 A1 * | 7/2006 | Neugebauer .................. 235/383 |
| 2006/0169771 A1 * | 8/2006 | Brookner ...................... 235/382 |
| 2007/0024424 A1 * | 2/2007 | Powell .......................... 340/10.1 |
| 2007/0262851 A1 * | 11/2007 | Stewart et al. ............. 340/10.41 |
| 2007/0285256 A1 * | 12/2007 | Batra .......................... 340/572.8 |
| 2008/0018466 A1 * | 1/2008 | Batra et al. ................. 340/572.1 |
| 2008/0211636 A1 * | 9/2008 | O'Toole et al. ............ 340/10.33 |
| 2009/0121837 A1 * | 5/2009 | Kitayoshi et al. ............ 340/10.1 |
| 2009/0216497 A1 * | 8/2009 | Schwiers et al. .............. 702/188 |
| 2010/0188225 A1 * | 7/2010 | Pillai .......................... 340/572.1 |

OTHER PUBLICATIONS

Microchip, "FSK Reader Reference Design", Microchip Technology Inc. (Jan. 1, 1998).

Microchip AN678, "RFID Coil Design", Microchip Technology Inc. (Jan. 1, 1998).

Microchip AN680, "Passive RFID Basics", Microchip Technology Inc. (Jan. 1, 1998).

Motorola, "RFID: Everything You Need to Know" (Nov. 11, 1997).

Motorola, "The ProxSmith™ System User Manual" (Apr. 15, 1999).

Motorola Indala Corporation, "Installation and Operation Instructions", PR-10 Manual (Jul. 8, 1994).

SIA, "Access Control Standard Protocol for the 26-BIT Weigand TM Reader Interface" (Oct. 17, 1996).

Wikipedia, definition of "Radio-frequency identification", URL: http://en.wikipedia.org/wiki/Radio-frequency identification (2008).

XTend OEM RF Modules, Product Datasheet. URL: www.digi.com/pdf/ds_xtendmodule.pdf.

Notice of Allowance in U.S. Appl. No. 12/389,179, mailed on Jul. 11, 2012.

Office Action in U.S. Appl. No. 12/389,179, mailed on Jan. 25, 2012.

* cited by examiner

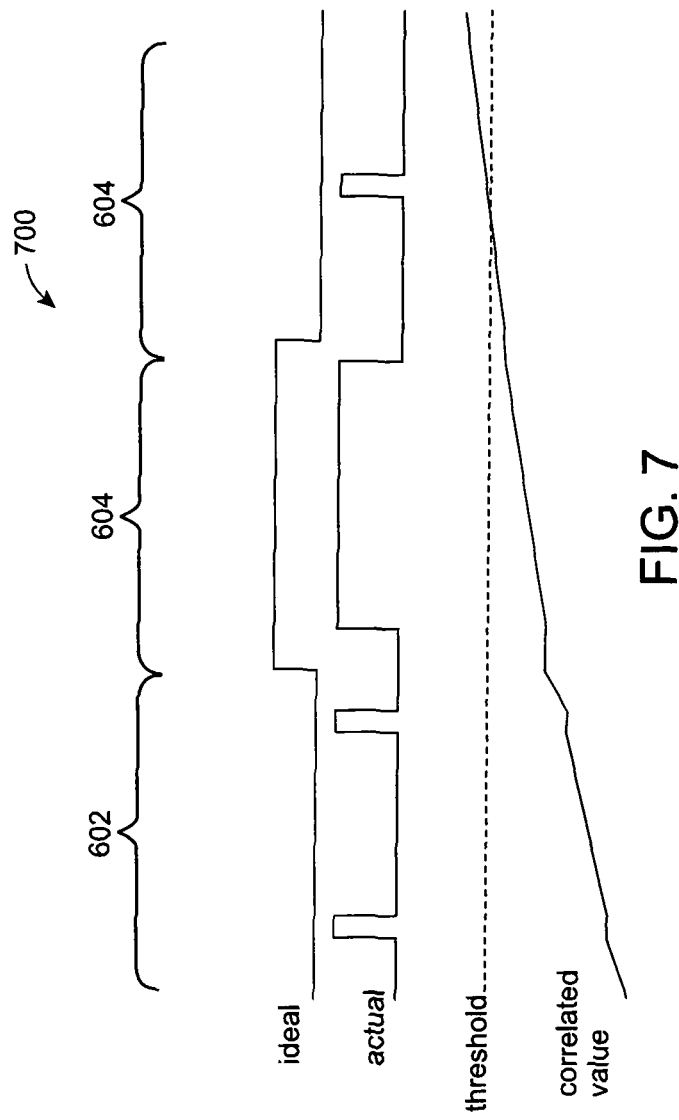

Command the Tag to Transmit Information Stored on the Tag (Different From the Identification Value) to the Reader (or to another device) ─838f

FIG. 8E

LONG RANGE RADIO FREQUENCY IDENTIFICATION SYSTEM

RELATED APPLICATIONS

The present disclosure is a continuation-in-part of and claims the benefit of priority of U.S. patent application Ser. No. 12/389,179 filed on Feb. 19, 2009 (now U.S. Pat. No. 8,310,344, issued Nov. 13, 2012) bearing the same title and in the name of the same inventors, all commonly owned herewith and the contents of which are hereby incorporated by reference as if set forth fully herein.

TECHNICAL FIELD

The present disclosure relates generally to the technical field of radio frequency identification (RFID) systems.

BACKGROUND

Radio frequency identification systems are used in a wide number of applications. For example they are used as pass keys to open doors, gates and the like, they are used as product identification tags, they are used in toll collection systems and in similar situations where it is desirable to electronically read information at a distance and perform an act in response to the information read. In the past, such systems have generally been limited to relatively short range operation on the order of a few inches up to a few feet.

Long range use (on the order of up to or exceeding about 1020 feet) of RFID systems has been limited somewhat because there are a limited number of radio frequency bands available for such applications and some of those bands are subject to various types of radio frequency interference (RFI). Radio frequencies used for RFID applications typically include the ISM (Industrial-Scientific-Medical) frequency bands which are defined by international convention as well as the communications laws of individual countries. In the United States, the 902-928 MHz band and the 2400-2500 MHz band are commonly used as are other bands. Unlicensed use of these bands is subject to transmitted power and other technical limitations. Users of ISM bands must generally accept any interference present on those bands. One example of such interference is the broadband noise generated by CDMA (code division multiple access) spread spectrum mobile telephony in the 800-1000 MHz frequency range. This type of transmission tends to raise the noise floor in this and adjacent frequency bands because while the CDMA signals are not particularly strong on any particular frequency within the spread spectrum frequency band, the signal is constantly and rapidly changing frequencies within the spread spectrum frequency band and, as a result, the general noise level within the spread spectrum frequency band increases. Another example of such mobile telephony induced interference is the noise generated by TDMA (time division multiple access) mobile telephony in the same general range of frequencies. TDMA noise tends not to raise the noise floor, but rather to impart narrow bandwidth, relatively high amplitude spikes (and associated spurious signals) across the frequency band in which it is active, as well as in adjacent bands.

When designing RFID systems for use in vehicles (as in toll, gate access, and similar applications) as well as RFID systems for handheld use at a distance, relatively high-power CDMA and TDMA noise sources are now commonplace as individuals, both outside and particularly within the vehicles can often be expected to be using TDMA or CDMA cell phones and similar data communication devices which can potentially interfere with the use of such RFID systems.

What is desired is an RFID system operable at a distance up to or exceeding about 20 feet and which is not subject to CDMA, TDMA and similar types of interference and which includes a low power consumption component mountable in a vehicle for long term operation.

OVERVIEW

A method, apparatus and system for radio frequency (RF) identification provides a modulated RF illumination signal configured to illuminate an RF identification (RFID) tag within a zone of interest, the illumination signal disposed within a first range of frequencies and modulated to represent a sequence of bits each having a first bit state or an opposite bit state. The illumination signal is received at the RFID tag, rectified to generate a wake signal which is used to awake a processor which is subsequently powered by a battery coupled to the RFID tag circuitry. The received illumination signal is sampled with a wide band receiver and subjected to a thresholding process in which a noise amplitude floor associated with the sampled illumination signal is dynamically adjusted. The sampled illumination signal is correlated to determine its bit sequence and its bit sequence is correlated against a predetermined key comprising a plurality of bits to determine if the sampled illumination signal is sufficiently correlated with the predetermined key.

An identification signal carrying an access code from the RFID tag is transmitted from the RFID tag in response to determining that the received illumination signal is sufficiently correlated with the predetermined key, the identification signal is modulated to reflect the access code value associated with the RFID tag, and the identification signal is transmitted within a second range of frequencies outside the first range of frequencies. The identification signal is received by a receiver, demodulated to obtain the access code, the access code is checked against a database of authorized RFID tag access codes, and, in response to determining that the RFID access code from the RFID tag is authorized, one or more actions may be taken. Alternatively, in response to determining that the access code from the RFID tag is not authorized, no action, or one or more different actions may be taken.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

In the drawings:

FIG. 7 is a graph illustrating a correlation process used in receiving the illumination signal in accordance with one embodiment.

FIGS. 8A, 8B, 8C, 8D and 8E are a process flow diagram illustrating a method of radio frequency identification in accordance with one embodiment.

DESCRIPTION OF EXAMPLE EMBODIMENTS

Figure 1:
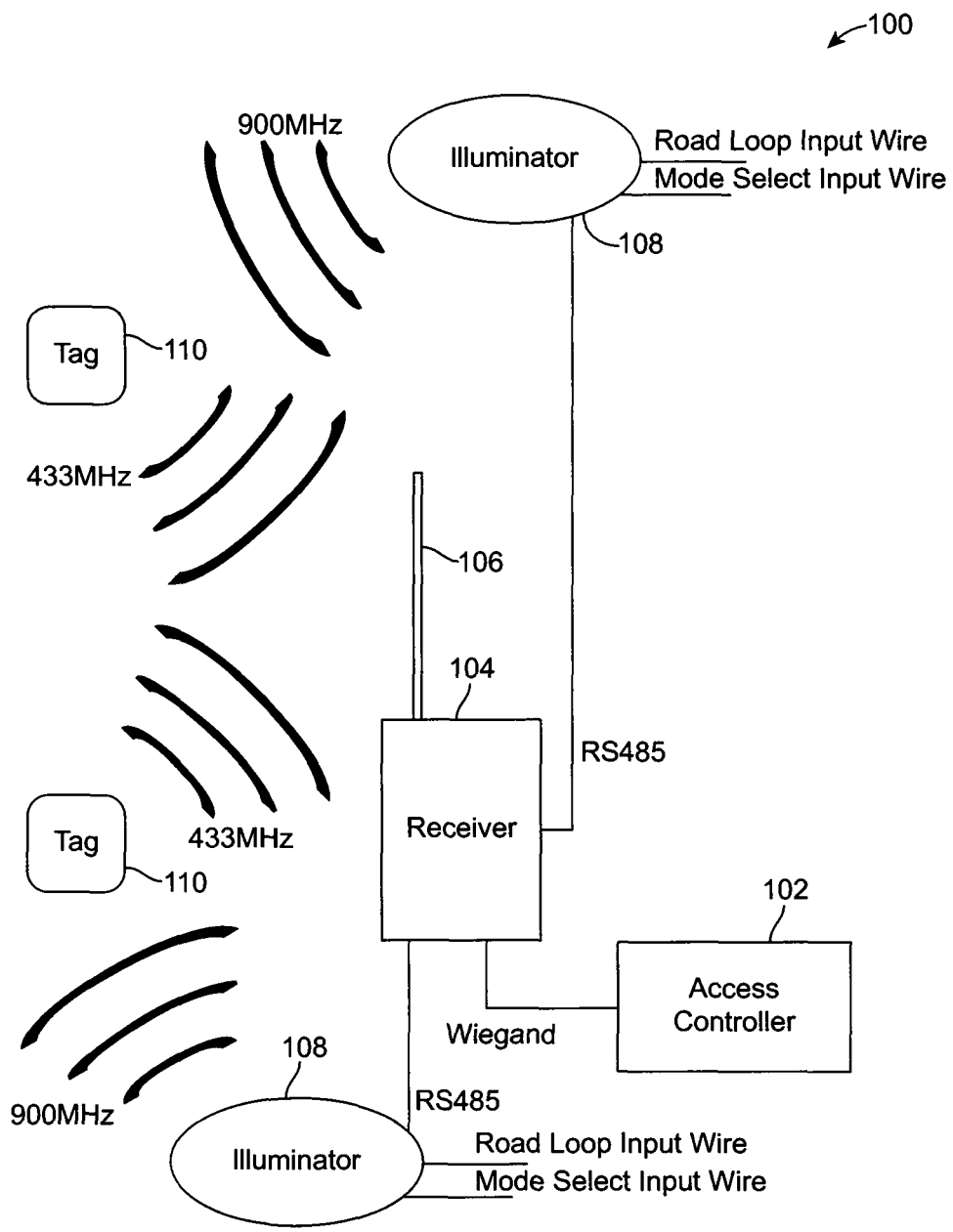
FIG. 1 is a system block diagram illustrating the major components of a system implemented in accordance with one embodiment.

Example embodiments are described herein in the context of an automatic secure access system. Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings. The same reference indicators will be used to the extent possible throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with this disclosure, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Eraseable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card, paper tape and the like) and other types of program memory.

References herein to "one embodiment" or "an embodiment" or "one implementation" or "an implementation" means that a particular feature, structure, part, function or characteristic described in connection with the embodiment can be included in at least one embodiment of the invention. The appearances of phrases such as "in one embodiment" or "in one implementation" in different places within this specification are not necessarily all referring to the same embodiment or implementation, nor are separate and alternative embodiments necessarily mutually exclusive of other embodiments.

In accordance with one embodiment, a long range RFID tag system is provided with the ability to provide automatic secure access to a restricted area at a range of up to or exceeding about 1020 feet. The system described below is configured to accommodate two channels, however one or more channels may be accommodated. In one embodiment, the system monitors and provides automatic secure access to a zone of interest such as a driveway leading to an access gate, a toll lane, or the like. For example, in accordance with one embodiment, an automobile may approach an access gate, the portion of the system mounted at the gate will transmit a more or less continuous illumination signal (or potentially a plurality of alternating illumination signals directed in different directions), the portion of the system on board the automobile will receive the illumination signal, verify it, and if verified, respond by transmitting an identification signal having modulated thereon an access code associated with the RFID tag. The identification signal will, in turn, be received by the portion of the system mounted at the gate which will, in turn, demodulate and verify the access code, and, if verified, typically respond by opening the gate and/or performing other actions such as recording a toll, turning on lights, or the like. Features of the system disclosed herein include preservation of battery life of a battery associated with the circuitry associated with the automobile by not turning on at least a portion of that circuitry until the illumination signal is detected, utilization of a correlation technique to identify the presence of the appropriate illumination signal and to help defeat TDMA and CDMA-type interference in or near the frequency band of the illumination signal, and utilization of different frequency bands for the illumination signal and the access code signal. Other features will also become apparent and the invention is not intended to be limited to only systems incorporating these features.

FIG. 1 is a system block diagram illustrating the major components of a system implemented in accordance with one embodiment. The components include a conventional access controller 102, a receiver 104 configured to receive radio frequency (RF) identification signals (carrying RFID tag access codes) from RFID tags, an antenna 106 for receiver 104, one or more illuminators 108 and RFID tags 110. In accordance with one embodiment, the illuminators are RF transmitters coupled to directional RF antennas which transmit a directional illumination signal in the 902-928 MHz ISM band (sometimes referred to as the 900 MHz band) directed at the zone of interest. In response to the reception and verification of the illumination signal the RFID tags responsively transmit (transpond) an identification (ID) signal at about 433 MHz carrying thereon a modulated access code signal associated with the RFID tag. In accordance with other embodiments, other frequency bands may be used for illumination and/or transponding.

In one embodiment receiver 104 communicates with illuminators 108 over a serial bus such as a conventional IEEE RS-485-type bus. Other communications means coupling the illuminators 108 and the receiver 104 could be used as those of ordinary skill in the art will now realize. In one embodiment the illuminators 108 transmit only when instructed to do so, e.g., periodically or in response to some additional sensor input. This is not a requirement but, when highly directional antennas are used with the illuminators 108 it can be advantageous as described in further detail below.

The tags 110 incorporate a passive receiver circuit to receive the 900 MHz band illumination signal. When this signal is received and validated by the tag, the tag then transmits back to the receiver 104 on a 433 MHz link which may be, in one embodiment, encrypted with a conventional rolling code type of encryption algorithm so as to prevent an observer from simply recording the observed signal and playing it back to gain access. Because in a multi-illuminator system the receiver 104 has knowledge of which illuminator caused the tag to transmit (due to directional antennas illuminating discreet areas of interest), the receiver 104 knows which lane or discreet area of interest the tag 110 is in and can then transmit a signal to the access controller 102 telling it which lane's gate or other access control device to activate to permit access (or charge a toll, or the like). Conventional Wiegand-type protocols well known in the access control industry may be used in accordance with one embodiment for communication among one or more components.

Receiver 104 in one embodiment coordinates the operation of this system. It instructs the illuminators 108 to transmit, receives replies from tags 110, and communicates with access controller 102 which in turn drives the access control devices such as gates, door locks and the like. Other configurations would also work and are contemplated herein as will now be apparent to those of ordinary skill in the art. For example, the various components could be tied to a central computer which manages the functions of the various components.

Figure 2:
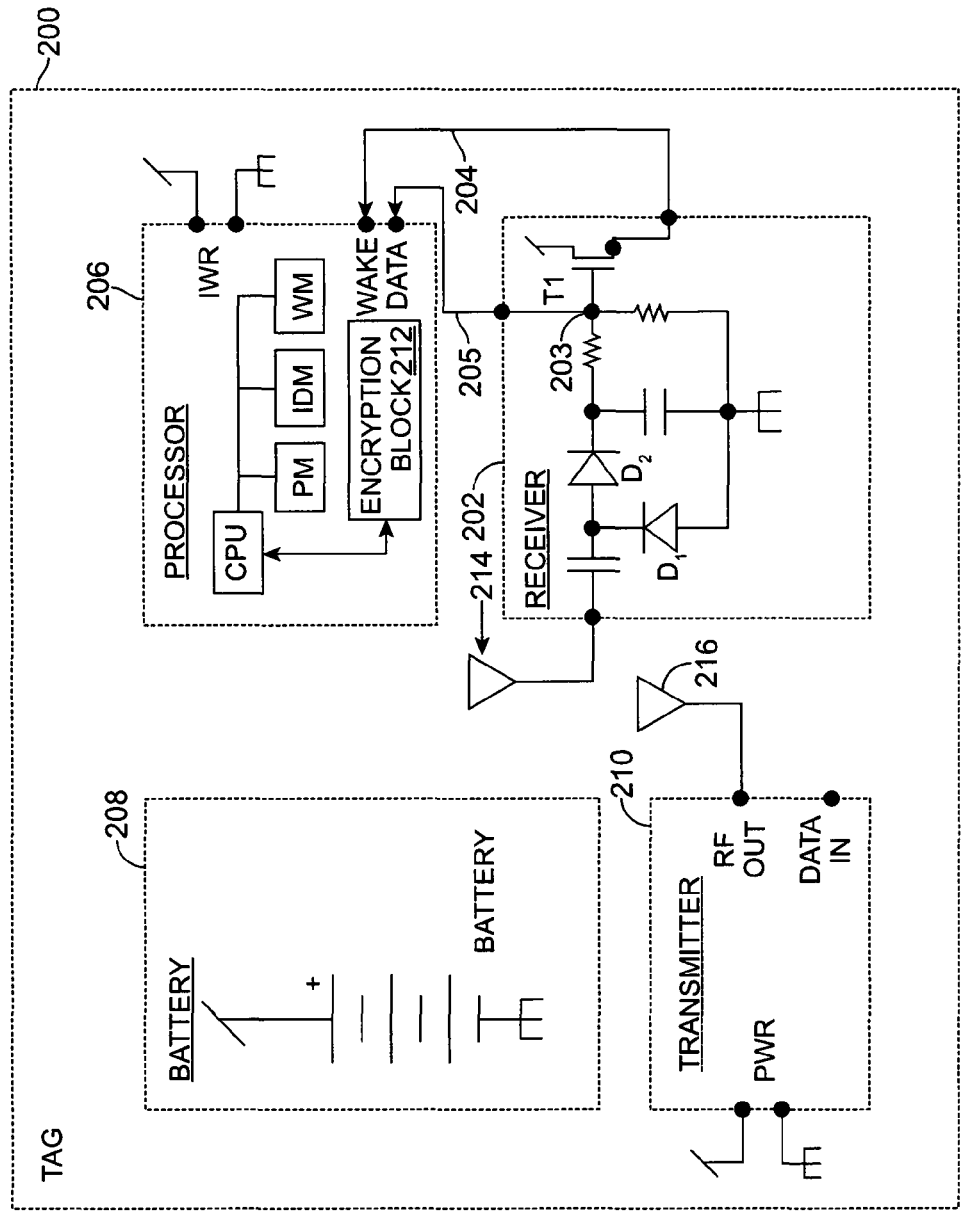
FIG. 2 is a schematic block diagram of an RFID tag in accordance with one embodiment.

FIG. 2 is a schematic block diagram of an RFID tag 200 (110 in FIG. 1) in accordance with one embodiment. Tag 200 is preferably of relatively inexpensive design and long-lived (i.e., does not require frequent battery replacement). (Note that in an alternative embodiment the battery may be a large battery associated with a vehicle in which the RFID tag is disposed and the RFID tag may be coupled to that battery.) Its receiver 202 may, in one embodiment, be formed of a pair of RF detector diodes D1, D2 connected in a conventional voltage-doubling configuration and matched to about 915 MHz (essentially in the middle of the 902-928 MHz band). That approach gives a simple, inexpensive amplitude-modulated (AM) detector that can be completely passive in that it draws no current, but it is without a bandpass filter and thus subject to out of band interference. The tag according to this embodiment is completely powered down until there is enough RF energy present at the detector to turn on a transistor T1 which then wakes the microcontroller (processor) 206 over line 204 to start the decoding process. Decoded data from node 203 is passed to processor 206 over line 205. This approach minimizes current draw and thereby gives tag 200 an extremely long battery life (as processor functions are powered by a battery 208 on board tag 200). In one embodiment, tag 200's transmitter 210 may be a surface acoustic wave (SAW)-based amplitude shift keyed (ASK) transmitter operating at about 433.92 MHz. The transmission may preferably be encrypted with a rolling code type of algorithm implemented in encryption block 212 of processor 206 in a conventional manner in order to thwart attempts to bypass the security of the system with a record and playback mechanism. A conventional receive antenna 214 provides signal to rectification circuit 204 and receiver 202 while another conventional transmit antenna 216 transmits the signal from transmitter 210. Within the processor 206 are conventional blocks such as a central processing unit (CPU) which may be implemented in any conventional and suitable manner, a program memory (PM) which may be embedded with the CPU or external to it, an ID memory (IDM) for storing the identification value associated with tag 200 (this could also be implemented as part of transmitter 210 if desired). This value can be programmed into IDM in conventional ways. A working memory (WM) may also be provided to handle correlation tasks carried out by the CPU. Note that while T1 is shown in FIG. 2 in an emitter-follower configuration, it may also be implemented in other ways, such as, for example, in an open collector configuration, if desired.

In one embodiment illuminator/transmitter 108 may be implemented with a 9XTend module available from DIGI Corporation. This module is particularly advantageous as it has existing Federal Communications Commission (FCC) approval for operations within the 902-928 MHz band in the United States. Those of ordinary skill in the art will now realize that other devices could be used instead. This module is nominally an FM transmitter that has a high level interface to the host product. In this case "high level" means that it expects to only receive the user payload from the host. It carries out frequency hopping, power amplifier control, training bits, cyclic redundancy check, and the like internally and automatically. In order to use it as an AM transmitter in this application, the 9XTend is set to the highest data rate, set to use the broadcast address, and its receiver is disabled. To send an RF pulse, the host (receiver 104) sends one byte of data to the 9XTend which, in turn, transmits an entire FM packet, frequency hopping as it goes, but to the tag 200 which has a wide band receiver and is looking at the entire 902-928 MHz band at once (and potentially an even wider range of frequencies), it sees just a pulse without frequency discrimination and thus does not have to actively track the frequency hopping of the transmitter. This approach is advantageous for a number of reasons. First, it is relatively inexpensive to implement. Second, the use of a gain antenna coupled to the output of the transmitter can provide a relatively high EIRP (Effective Isotropically Radiated Power) for the individual frequency hopping pulses as well as directional selectivity. Third, use of a wide band receiver obviates the need for a complex frequency-locked receiver which would normally be required to receive a frequency-hopping spread spectrum signal and allows the use of a simple amplitude modulation scheme.

The shortest possible packet for the 9XTend to transmit is 6.6 ms. Accordingly, in one embodiment the presence of a pulse is defined as a logic "1" and the absence of a pulse is defined as logic "0"; the bit stream for a packet is 32 bits long (211.2 ms); approximately 4 transmissions per second can occur of the entire illumination signal.

Those of ordinary skill in the art will now realize that other variations may be used—other radios, modulation means, and encoding schemes may also be used as well without departing from the inventive concepts herein. For example, amplitude modulation may alternately be accomplished with power supply switching, PIN diodes, MMIC switches, and the like.

Figure 3:
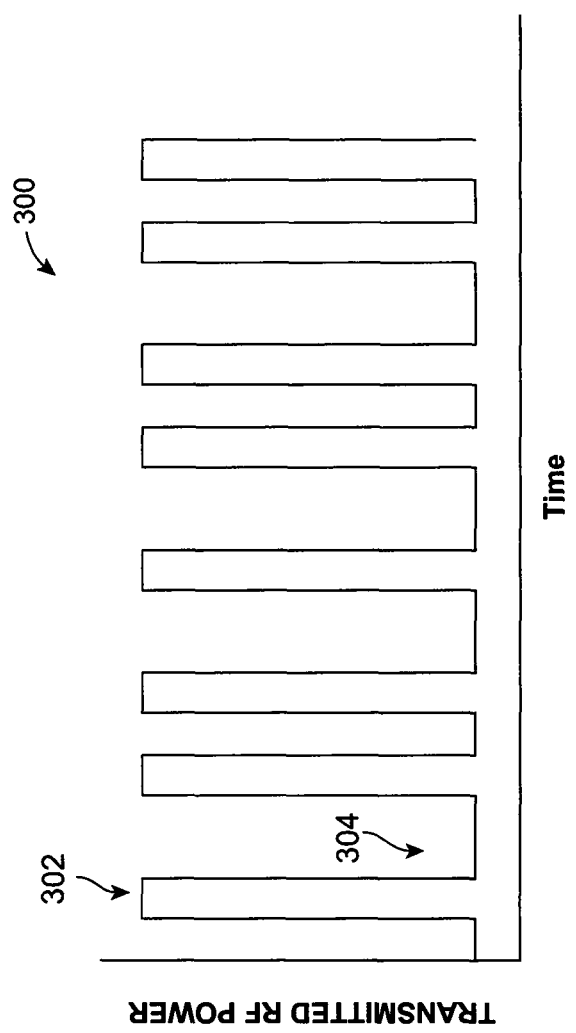
FIG. 3 is a graph of transmitted power vs. time illustrating the transmission of an illumination signal from a fixed transmitter as a series of pulses and gaps representing the 1s and 0s of binary data in accordance with one embodiment.

FIG. 3 is a graph 300 of transmitted power vs. time illustrating the transmission of an illumination signal from a fixed transmitter as a series of pulses 302 and gaps 304 representing the 1s and 0s of binary data in accordance with one embodiment. The sequence of bits, in one embodiment, incorporates some limitations to aid in its reception by low power processors. First, in this embodiment, there cannot be two 1's next to each other due to how bits are decoded using correlation (illustrated at FIG. 7). Second, there should be a relatively high density of 1's (pulses) in order to give the receiver as much timing information as possible, so the number of consecutive 0's (gaps) was limited to two. The bit sequence of the presently disclosed embodiment was chosen to be 32 bits long which is long enough to allow for several unique sequences that meet the above criteria while being short enough to correlate an entire sequence relatively quickly. Those of ordinary skill in the art will now realize that other variations are also possible and within the inventive concepts disclosed herein. Also it should be noted that pulses may represent 1's while gaps represent 0's, or vice versa, or through an encoding some pulses could be 1's while other pulses were 0's, and the like.

Figure 4:
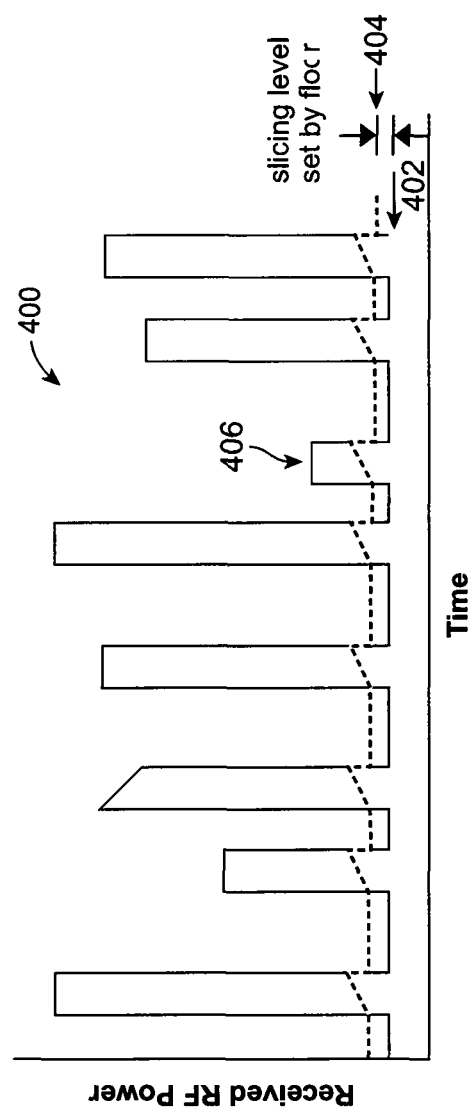
FIG. 4 is a graph of received power vs. time illustrating the reception of an illumination signal at a portable RFID tag from a fixed transmitter as a series of pulses and gaps representing the 1s and 0s of binary data in accordance with one embodiment.

FIG. 4 is a graph 400 of received power vs. time illustrating the reception of an illumination signal at a portable RFID tag from a fixed transmitter as a series of pulses and gaps representing the 1s and 0s of binary data in accordance with one embodiment. The 9XTend transmitter sends each packet of data on a different frequency in the 902-928 MHz band. As a result, each pulse 302 is on a different frequency within the band but it experiences different multi-path interference as that type of interference depends (among other things) on frequency. This has the effect of making the pulse powers (heights in FIG. 4, for example) quite variable. For this reason a thresholding approach is used to set the difference between what is considered a "1" and what is considered a "0". The thresholding approach used in one embodiment is to set the threshold at a relatively low value rather than at a mid-point. The threshold level 404 is set at a fixed delta above the calculated noise floor as shown, for example, in FIG. 4. The delta is a non-critical fixed value used by the processor that is determined empirically for a given system in order to minimize the errors due to noise from below and the allow a maximum amount of room above so that the pulse can be greatly attenuated and still be above the threshold. Those of ordinary skill in the art will now readily understand how to set the delta in a given system. In FIG. 4 the low level of the noise floor is the line 402 (below that level it is impossible to tell a pulse from a gap). The "noise floor" as used herein is just the minimum measurement of the RF power which can be, at a given moment, a combination of the desired signal, interference and noise. Its graph is not explicitly shown to avoid over-complicating the drawings, but it would look like the threshold level 404 but shifted lower. The thresholding level is set where it is so as to avoid the noise while accommodating relatively short pulses such as pulse 406. Given that the power changes, the noise floor value in the processor is smoothed by a conventional slow attack fast release algorithm so that the value will slowly climb to try to match the measured power level but will reset to a low value quickly. That is seen in the saw tooth waveform of threshold level 404 in FIG. 4, for example.

This approach works well in accommodating CDMA-type interference which is characterized as a spread spectrum noise which tends to raise the noise floor but in a relatively consistent manner. Since the tags are to operate in some embodiments within a vehicle such as an automobile and people within the automobile may be using CDMA devices, the received noise can be expected to be quite high.

Figure 5:
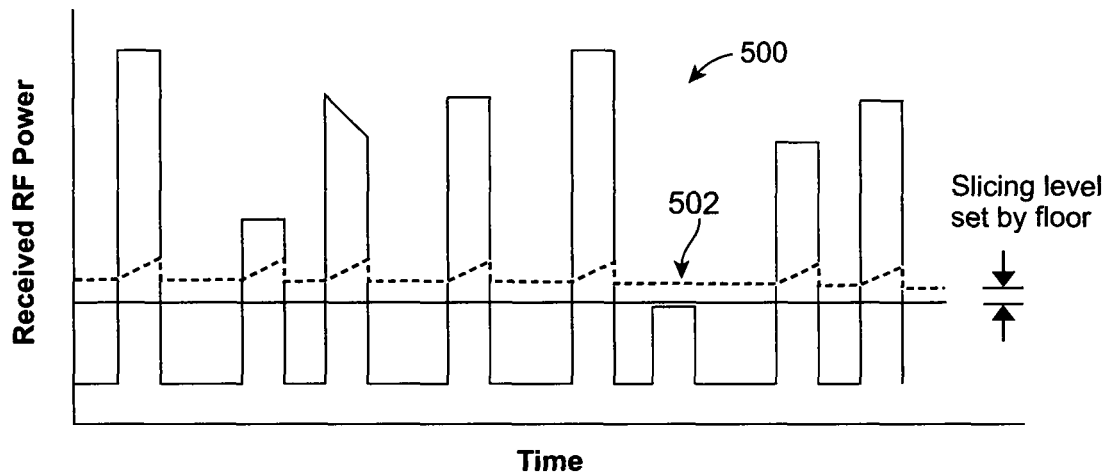
FIG. 5 is a graph of received power vs. time illustrating the reception of an illumination signal at a portable RFID tag from a fixed transmitter in the presence of CDMA-type noise as from a nearby CDMA cell phone or communication device in accordance with one embodiment.

FIG. 5 is a graph 500 of received power vs. time illustrating the reception of an illumination signal at a portable RFID tag from a fixed transmitter in the presence of CDMA-type noise as from a nearby CDMA cell phone or communication device in accordance with one embodiment. As can be seen in FIG. 5, the noise floor has been raised in comparison to that of FIG. 4 and to a level at which pulse 502 is covered up. In this case the pulse 502 is not decoded because of the combination of multi-path interference and CDMA interference. To accommodate this, there should be a relatively high density of pulses going to the tag in order that the tag's software may find as many pulses as possible and, using identification correlation, conclude that a match has been made even if not all pulses are actually received in a 32-bit transmission.

Figure 6:
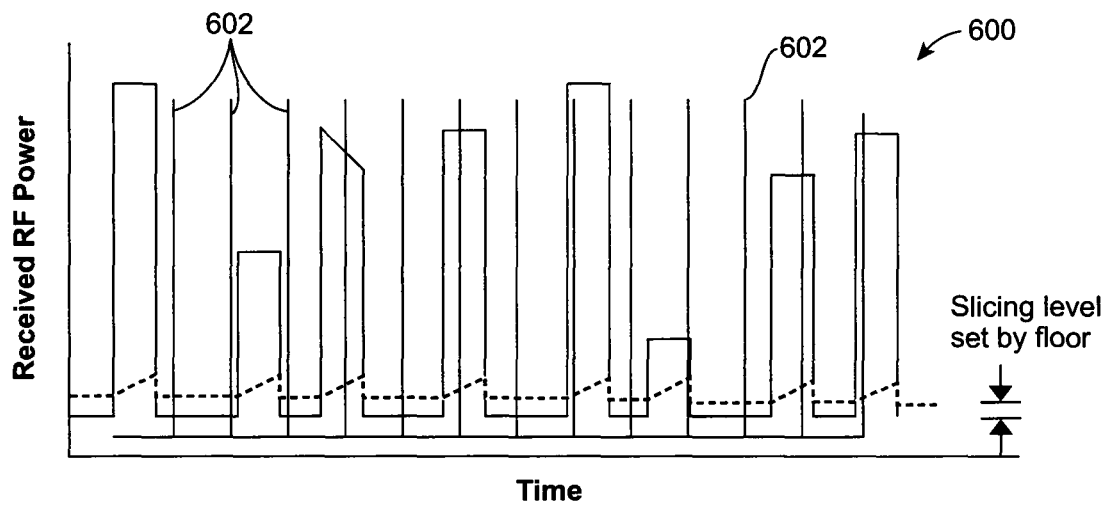
FIG. 6 is a graph of received power vs. time illustrating the reception of an illumination signal at a portable RFID tag from a fixed transmitter in the presence of TDMA-type noise as from a nearby TDMA cell phone or communication device in accordance with one embodiment.

FIG. 6 is a graph 600 of received power vs. time illustrating the reception of an illumination signal at a portable RFID tag from a fixed transmitter in the presence of TDMA-type noise as from a nearby TDMA cell phone or communication device in accordance with one embodiment. TDMA technology is used with cell phones such as GSM cell phones and most modern and planned cell phones. Rather than raising the noise floor as illustrated in FIG. 5, TDMA technology puts narrow but relatively high-powered spikes into the reception stream as illustrated by the spikes 602 illustrated in FIG. 6.

Because the TDMA interference pulses are of short duration compared to the 6.6 ms pulses generated by the illuminators, the threshold is not changed much, but an edge detection scheme for finding the pulses would clearly not work due to the many edges created by the narrow pulses. In order to get around this, the thresholded values are correlated with an ideal pulse in order to find the presence of pulses and to keep the pulse timing synchronized. The correlation works not only to mitigate the effects of GSM/TDMA-type signals, but also most any other type of short duration noise interference.

FIG. 7 is a graph 700 illustrating a correlation process used in receiving the illumination signal in accordance with one embodiment. In accordance with the scheme illustrated in FIG. 7, the RF input is sampled in one embodiment at 8 times per pulse period and the last 24 samples (3 pulse periods) are used to correlate with an "ideal" case. For example, a simple case of sending 0-1-0 is shown in FIG. 7. The "actual" sampled data has a shorter pulse width than expected and TDMA interference is present during the "0" times. The "correlated value" line shows how the correlation works, i.e., when the "actual" agrees with the "ideal" a counter in software/firmware associated with the CPU is incremented causing the "correlated value" to increase. When they disagree, no increase. If the counter ultimately exceeds a "threshold" value, the pulse has been detected. The pulse is not output immediately upon crossing the threshold. Rather, the correlation continues for several samples in order to find the maximum correlation value. Once the maximum is found, the pulse is output, and the timing is adjusted based upon when the maximum occurred.

Finally, after the pulses have been decoded into ones and zeroes, the resulting bits are shifted through another correlator. That correlator checks the bit pattern in the shift register against the 32 bit pattern defined in the code. If the correlation value between the two is above a predetermined threshold, then the tag decides that it has verified the illumination signal. When that happens, in one embodiment, the tag stops decoding the 915 MHz signal and starts sending a burst of packets on 433 MHz which correspond to an identification signal carrying the RFID tag's access code.

FIGS. 8A, 8B, 8C, 8D and 8E are a process flow diagram illustrating a method 800 of radio frequency identification in accordance with one embodiment. The method described here highlights some steps for achieving access control in accordance with one embodiment. Modifications are possible and will be apparent to those of ordinary skill in the art. At block 802 the process begins. At 804 an illumination signal is provided by illuminator(s) 108 as described in detail above. At 806 the illumination signal is received at tag 200. At 808 rectification circuit 204 generates a wake signal. At 810 the wake signal is applied to wake up the processor 206 at tag 200. At 812 the processor 206 wakes up and begins drawing power from battery 208. At 814 the illumination signal received by receiver 202 is fed to processor 206 and sampled—typically at a rate of 8 times per 6.2 ms pulse. At 820 the processor dynamically adjusts a noise amplitude floor for the sampled illumination signal. At 822 the processor sets a threshold amplitude above the noise floor. This is typically a fixed amount above the noise floor in one embodiment. At 824 the processor correlates the sampled illumination signal to determine its bit sequence. At 830 the processor correlates the determined bit sequence against a predetermined multibit key (the expected bit sequence from the illuminators and which may be predetermined and fixed or may be periodically changed) to determine if the sampled illumination signal is sufficiently correlated with the key. At 832 the tag transmits its ID signal if the sampled illumination signal is sufficiently correlated with the key. The ID signal carries a modulated and optionally encrypted access code value associated with the RFID tag. At 834 the receiver 104 received the ID signal, extracts the access code value and at 836 verifies it against a database of authorized access code values. At 838 action is taken based on the result. For example, if the tag's access code is verified, then the gate would be opened and the automobile allowed to pass. If not, an alarm could be sounded or entry refused, and the like.

Figure 8A:
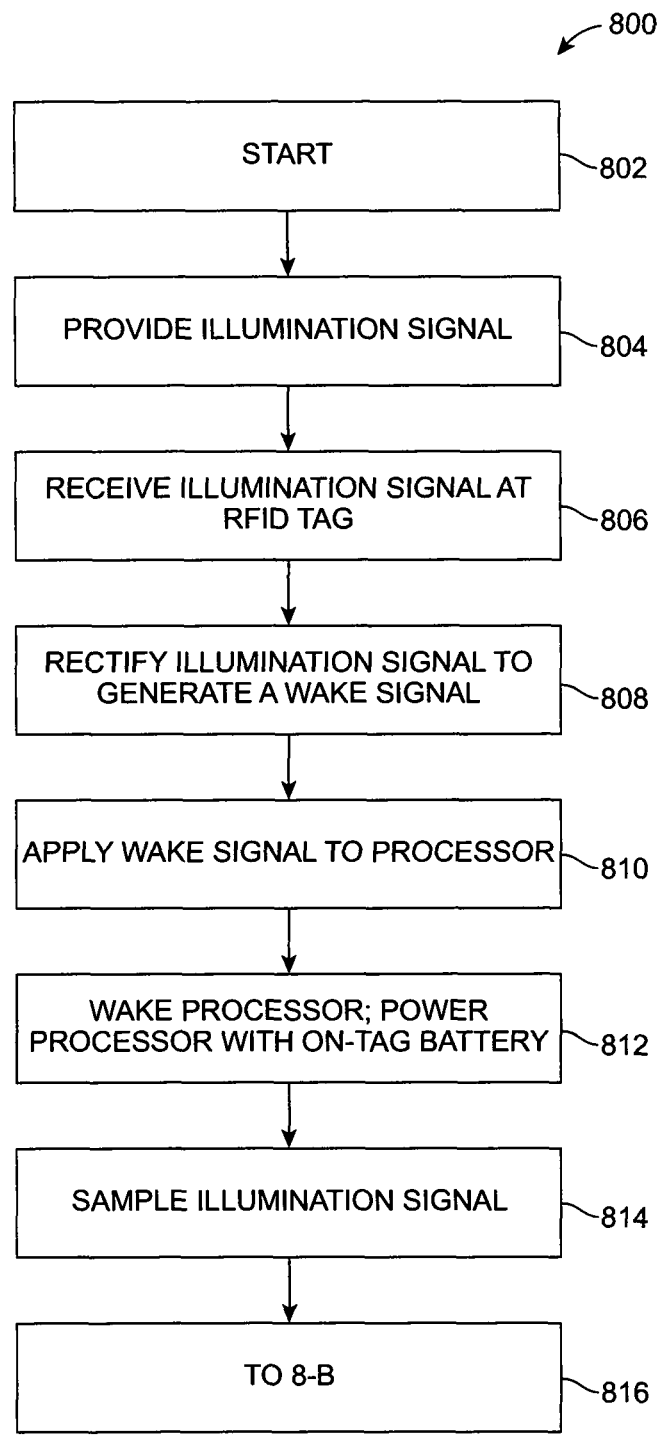
Figure 8B:
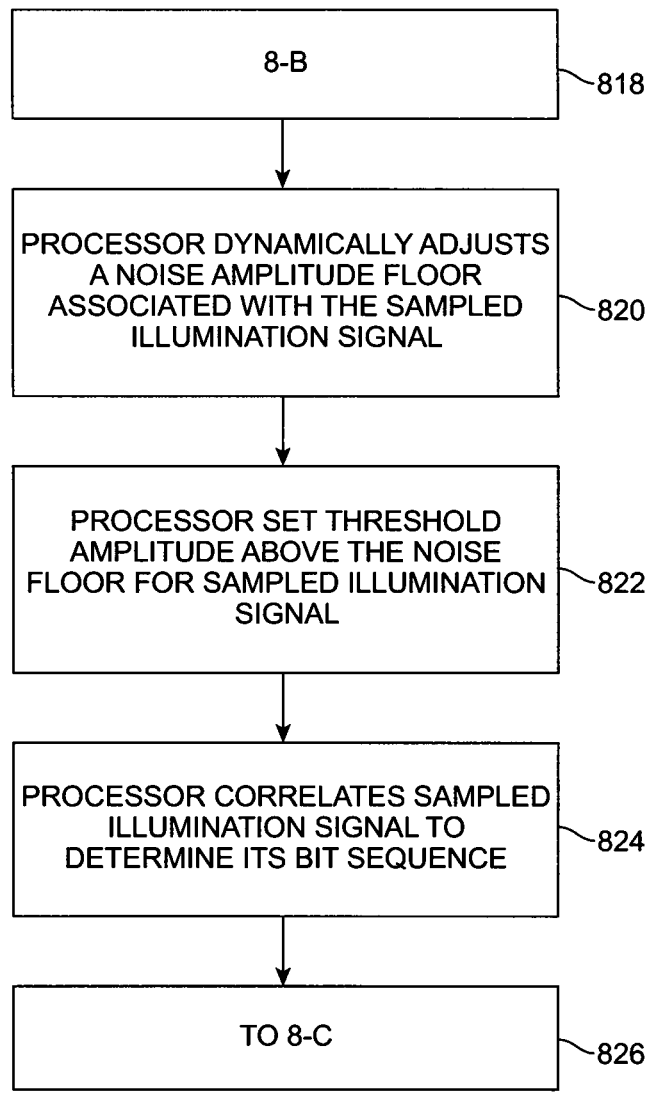
Figure 8C:
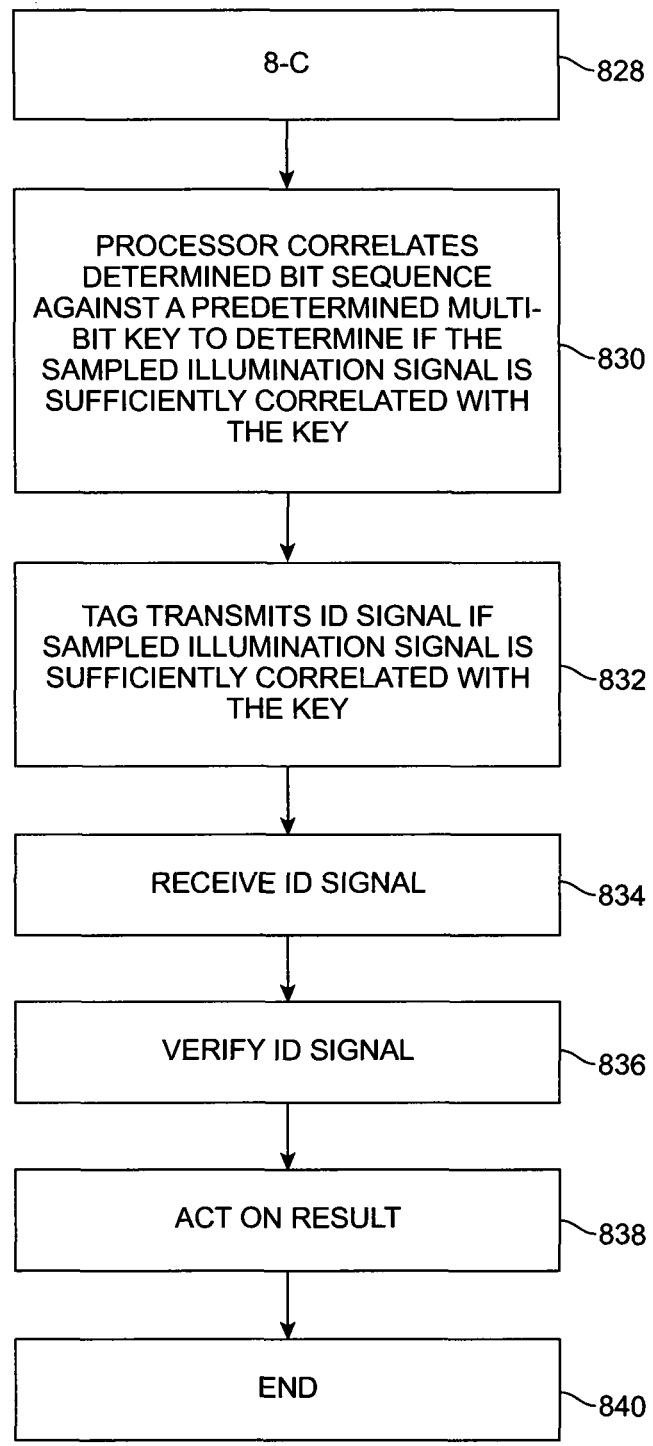
Figure 8D:
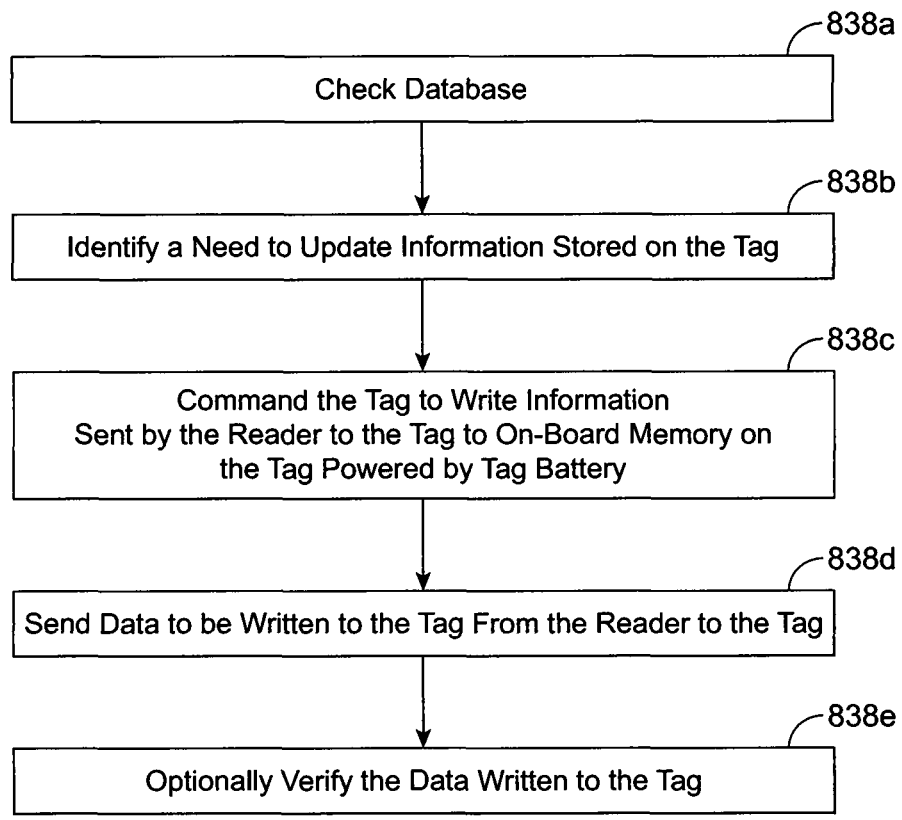

Turning now to FIG. 8D, in accordance additional embodiments, the RFID tag/transponder may be configured for more complex operations. For example, in a first extended mode of operation, the reader may illuminate the tag and receive an identification value from the RFID tag. For example, this could be the access code value as discussed above, or some other relatively unique value. Responsive to that identification value, the reader may check a database 838a and identify a need to update information stored on the tag 838b and command the tag to write information sent by the reader to the tag to on-board memory on the tag powered by the tag battery 838c. The information to be written would then be sent 838d. Optionally the data written would be verified 838e, as by requesting a readout from the tag or some other conventional form of data verification. In another mode of operation illustrated in FIG. 8E, the reader may, responsive to the identification value, instruct the tag to transmit information (in addition to the identification value) stored in memory on the tag back to the reader (or to some other device) 838f. Encryption may be incorporated as well know to those of ordinary skill in the art to prevent interception of transmitted information. Similarly, conventional data verification techniques may be employed to verify the data written to the tag. The information written to the tag may include inventory information (if the tag is used, for example, as an inventory tag for a container such as a pallet, box, shipping container, storage container, or the like. The information may alternatively include debits or credits applicable to stored value information stored on the tag as in the case of a gift or stored value card or a toll card for accessing a toll-way.

In another embodiment, a two frequency modulation scheme may be used. In accordance with this embodiment, the illumination signal used to illuminate the tag may comprise two or more discrete frequencies, f1 and f2. On the card circuitry is provided for filtering signals received at f1 and signals received at f2 and routing them separately. Signals are thresholded as before and those above threshold at f1 count as "bits" and those above threshold at f2 count as "bits". f1 (and f2) bits may be defined as "1" or "0" as desired and may be dynamically assigned, if desired for enhanced security. f1 and f2 may be fixed or may vary within a spread spectrum bandwidth in accordance with a predetermined pattern.

While embodiments and applications have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

What is claimed is:

1. A method for radio frequency identification, comprising:
providing a modulated illumination signal configured to illuminate a radio frequency identification (RFID) tag within a zone of interest, the illumination signal including at least a first discrete frequency and a second discrete frequency disposed within a first range of frequencies and modulated to represent a sequence of bits each having a first bit state or a second, opposite bit state;
receiving the illumination signal at the RFID tag;
rectifying the illumination signal at the RFID tag to generate a wake signal;
applying the wake signal to a processor associated with the RFID tag;
waking the processor in response to the wake signal and subsequently powering the processor from a battery coupled to the processor;
sampling the received illumination signal;
dynamically adjusting in the processor a noise amplitude floor value associated with each of the discrete frequencies of the sampled illumination signal;
determining in the processor a threshold amplitude value above the noise amplitude floor value above which each of the discrete frequencies of the sampled illumination signal is deemed to represent a bit and below which each of the discrete frequencies of the sampled illumination signal is deemed to not represent a bit;
correlating the sampled illumination signal to determine its bit sequence;
correlating the bit sequence of the sampled illumination signal against a predetermined key comprising a plurality of bits to determine if the sampled illumination signal is sufficiently correlated with the predetermined key;
transmitting an identification signal from the RFID tag in response to determining that the received illumination signal is sufficiently correlated with the predetermined key, the identification signal modulated to reflect an access code value associated with the RFID tag, and the identification signal disposed within a second range of frequencies outside the first range of frequencies;
receiving the identification signal;
demodulating the received identification signal to obtain the access code value; and
checking the access code value against a database of authorized RFID tag access code values; and
taking a first action in response to determining that the RFID tag access code value is authorized.

2. The method of claim 1, wherein the first action is to permit a holder of the RFID tag to carry out an action.

3. The method of claim 1, further comprising:
taking a second action in response to determining that the RFID tag access code value is not authorized.

4. The method of claim 1, wherein the first action includes opening a gate.

5. The method of claim 1, wherein the first action includes charging a toll.

6. A system for radio frequency identification, comprising:
means for providing a modulated illumination signal configured to illuminate a radio frequency identification (RFID) tag within a zone of interest, the illumination signal including at least a first discrete frequency and a second discrete frequency disposed within a first range of frequencies and modulated to represent a sequence of bits each having a first bit state or an opposite bit state;

means for receiving the illumination signal at the RFID tag;
means for rectifying the illumination signal at the RFID tag to generate a wake signal;
means for applying the wake signal to a processor associated with the RFID tag;
means for waking the processor in response to the wake signal and subsequently powering the processor from a battery coupled to the processor;
means associated with the processor for sampling the received illumination signal to generate a sampled illumination signal;
means associated with the processor for dynamically adjusting a noise amplitude floor value associated with each of the discrete frequencies of the sampled illumination signal;
means associated with the processor for determining a threshold amplitude value above the noise amplitude floor value above which each of the discrete frequencies of the sampled illumination signal is deemed to represent a bit and below which each of the discrete frequencies of the sampled illumination signal is deemed to not represent a bit;
means for correlating the sampled illumination signal to determine its bit sequence;
means for correlating the bit sequence of the sampled illumination signal against a predetermined key comprising a plurality of bits to determine if the sampled illumination signal is sufficiently correlated with the predetermined key;
means for transmitting an identification signal from the RFID tag in response to determining that the received illumination signal is sufficiently correlated with the predetermined key, the identification signal modulated to reflect an access code value associated with the RFID tag, and the identification signal disposed within a second range of frequencies outside the first range of frequencies;
means for receiving the identification signal;
means for demodulating the received identification signal to obtain the access code value;
means for comparing the access code value against a database of authorized RFID tag access code values; and
means for taking a first action in response to determining that the RFID tag access code value is authorized.

7. The system of claim 6, wherein the first action is to permit a holder of the RFID tag to carry out an action.

8. The system of claim 6, further comprising:
means for taking a second action responsive to the means for correlating the bit sequence determining that the RFID tag is not authorized.

9. The system of claim 6, wherein the first action includes opening a gate.

10. The system of claim 6, wherein the first action includes charging a toll.

11. A system for radio frequency identification, comprising:
a transmitter configured to provide a modulated illumination signal configured to illuminate a radio frequency identification (RFID) tag within a zone of interest, the illumination signal including at least a first discrete frequency and a second discrete frequency disposed within a first range of frequencies and modulated to represent a sequence of bits each having a first bit state or an opposite bit state;
a receiver configured to receive the illumination signal at the RFID tag;
a rectification circuit configured to rectify the illumination signal at the RFID tag to provide a wake signal;
a first circuit configured to apply the wake signal to a processor associated with the RFID tag;
the processor configured to awake from a sleep mode of operation in response to receiving the wake signal and configured to subsequently draw operating power from a battery coupled to the processor;
the processor further configured to sample the received illumination signal;
the processor further configured to dynamically adjust a noise amplitude floor value associated with each of the discrete frequencies of the sampled illumination signal;
the processor further configured to determine a threshold amplitude value above the noise amplitude floor value above which each of the discrete frequencies of the sampled illumination signal is deemed to represent a bit and below which each of the discrete frequencies of the sampled illumination signal is deemed to not represent a bit;
a second circuit configured to sample the received illumination signal;
the processor further configured to correlate the sampled illumination signal to determine its bit sequence;
the processor further configured to correlate the bit sequence of the sampled illumination signal against a predetermined key comprising a plurality of bits to determine if the sampled illumination signal is sufficiently correlated with the predetermined key;
a transmitter associated with the RFID tag and configured to transmit an identification signal from the RFID tag in response to determining that the received illumination signal is sufficiently correlated with the predetermined key, the identification signal modulated to reflect an access code value associated with the RFID tag, and the identification signal disposed within a second range of frequencies outside the first range of frequencies;
a receiver configured to receive the identification signal;
a demodulator configured to extract the access code value from the identification signal;
a comparator configured to compare the received access code value against a database of authorized access code values; and
a third circuit configured to take a first action in response to determining that the access code value is authorized.

12. The system of claim 11, wherein the first action is to permit a holder of the RFID tag to carry out an action.

13. The system of claim 11, further comprising:
circuitry for taking a second action responsive to the comparator determining that the RFID tag is not authorized.

14. The system of claim 11, wherein the first action includes opening a gate.

15. The apparatus of claim 11, wherein the first action includes charging a toll.

16. An RFID tag, comprising:
a receiver configured to receive an illumination signal at the RFID tag, the illumination signal including at least a first discrete frequency and a second discrete frequency and being a modulated signal disposed within a first range of frequencies and modulated to represent a sequence of bits each having a first bit state or an opposite second bit state;
a processor;
a rectification circuit configured to rectify the illumination signal to provide a wake signal to the processor;
a battery coupled to provide power to the processor when the processor is not in a sleep mode of operation;

the processor configured to awake from the sleep mode of operation in response to receiving the wake signal and configured to subsequently draw operating power from the battery;

the processor further configured to sample the received illumination signal;

the processor further configured to dynamically adjust a noise amplitude floor value associated with each of the discrete frequencies of the sampled illumination signal;

the processor further configured to determine a threshold amplitude value above the noise amplitude floor value above which each of the discrete frequencies of the sampled illumination signal is deemed to represent a bit and below which each of the discrete frequencies of the sampled illumination signal is deemed to not represent a bit;

the processor further configured to correlate the sampled illumination signal to determine its bit sequence;

the processor further configured to correlate the bit sequence of the sampled illumination signal against a predetermined key comprising a plurality of bits to determine if the sampled illumination signal is sufficiently correlated with the predetermined key; and a transmitter configured to transmit an identification signal in response to the processor's determination that the received illumination signal is sufficiently correlated with the predetermined key, the identification signal modulated to reflect an access code value associated with the RFID tag, and the identification signal disposed within a second range of frequencies outside the first range of frequencies.

17. A method for radio frequency identification, comprising:

providing a frequency hopping spread spectrum illumination signal configured to illuminate a radio frequency identification (RFID) tag within a zone of interest, the illumination signal including at least a first discrete frequency and a second discrete frequency and disposed within a first range of frequencies and modulated to represent a sequence of bits each having a first bit state or a second, opposite bit state;

receiving the illumination signal at the RFID tag;

rectifying the illumination signal at the RFID tag to generate a wake signal;

applying the wake signal to a processor associated with the RFID tag;

waking the processor in response to the wake signal and subsequently powering the processor from a battery coupled to the processor;

receiving the illumination signal with a broad band receiver;

dynamically adjusting in the processor a noise amplitude floor value associated with each of the discrete frequencies of the sampled illumination signal;

determining in the processor a threshold amplitude value above the noise amplitude floor value above which each of the discrete frequencies of the sampled illumination signal is deemed to represent a bit and below which each of the discrete frequencies of the sampled illumination signal is deemed to not represent a bit;

determining if the received illumination signal is sufficiently correlated with a key;

transmitting an identification signal from the RFID tag in response to determining that the received illumination signal is sufficiently correlated with the key, the identification signal modulated to reflect an access code value associated with the RFID tag, and the identification signal disposed within a second range of frequencies outside the first range of frequencies;

receiving the identification signal;

demodulating the received identification signal to obtain the access code value;

checking the access code value against a database of authorized RFID tag access code values; and taking a first action in response to determining that the RFID tag access code value is authorized.

18. An RFID tag, comprising:

a broadband receiver configured to receive a spread spectrum frequency hopping illumination signal, the illumination signal being a modulated signal including at least a first discrete frequency and a second discrete frequency and disposed within a first range of frequencies and modulated to represent a sequence of bits each having a first bit state or an opposite second bit state;

a processor;

a rectification circuit in the receiver configured to rectify the illumination signal to provide a wake signal to the processor;

a battery coupled to provide power to the processor when the processor is not in a sleep mode of operation;

the processor configured to awake from the sleep mode of operation in response to receiving the wake signal and configured to subsequently draw operating power from the battery;

the processor further configured to receive data from the receiver;

the processor further configured to dynamically adjust a noise amplitude floor value associated with each of the discrete frequencies of the sampled illumination signal;

the processor further configured to determine a threshold amplitude value above the noise amplitude floor value above which each of the discrete frequencies of the sampled illumination signal is deemed to represent a bit and below which each of the discrete frequencies of the sampled illumination signal is deemed to not represent a bit;

the processor further configured to correlate a bit sequence received from the receiver against a key comprising a plurality of bits to determine if the sampled illumination signal is sufficiently correlated with the key; and a transmitter configured to transmit an identification signal in response to the processor's determination that the received illumination signal is sufficiently correlated with the key, the identification signal modulated to reflect an access code value associated with the RFID tag, and the identification signal disposed within a second range of frequencies outside the first range of frequencies.

19. A system for radio frequency identification, comprising:

a broadband transmitter configured to provide a spread spectrum frequency hopping modulated illumination signal configured to illuminate a radio frequency identification (RFID) tag within a zone of interest, the illumination signal including at least a first discrete frequency and a second discrete frequency and disposed within a first range of frequencies and modulated to represent a sequence of bits each having a first bit state or an opposite bit state;

a receiver configured to receive the illumination signal at the RFID tag;

a rectification circuit configured to rectify the illumination signal at the RFID tag to provide a wake signal;

a first circuit configured to apply the wake signal to a processor associated with the RFID tag;

the processor configured to awake from a sleep mode of operation in response to receiving the wake signal and configured to subsequently draw operating power from a battery coupled to the processor;

a second circuit configured to supply a data signal from the receiver to the processor, the data signal derived from the illumination signal;

the processor further configured to dynamically adjust a noise amplitude floor value associated with each of the discrete frequencies of the sampled illumination signal;

the processor further configured to determine a threshold amplitude value above the noise amplitude floor value above which each of the discrete frequencies of the sampled illumination signal is deemed to represent a bit and below which each of the discrete frequencies of the sampled illumination signal is deemed to not represent a bit;

the processor further configured to compare a bit sequence received from the receiver against a key comprising a plurality of bits to determine if the received bit sequence is sufficiently correlated with the key;

a transmitter associated with the RFID tag and configured to transmit an identification signal from the RFID tag in response to determining that the received bit sequence is sufficiently correlated with the key, the identification signal modulated to reflect an access code value associated with the RFID tag, and the identification signal disposed within a second range of frequencies outside the first range of frequencies;

a receiver configured to receive the identification signal;

a demodulator configured to extract the access code value from the identification signal;

a comparator configured to compare the received access code value against a database of authorized access code values; and a third circuit configured to take a first action in response to determining that the access code value is authorized.

20. The method of claim 17, wherein the first action includes:

commanding the RFID tag to transmit additional information.

21. The method of claim 20, wherein the additional information includes inventory information.

22. The method of claim 20, wherein the additional information includes toll information.

23. The method of claim 20, wherein the first action includes:

commanding the RFID tag to write certain information to a memory associated with the RFID tag; and transmitting the certain information to the RFID tag.

24. The RFID tag of claim 18, wherein the processor is further configured to:

receive a command to transmit data stored in a memory on board the RFID tag; and in response to reception of the command to transmit data, transmits the data.

25. The RFID tag of claim 18, wherein the processor is further configured to:

receive a command to write certain data to a memory on board the RFID tag; and in response to reception of the command to write data and the data, writes the data.

* * * * *